Dec. 5, 1944.       E. F. AHLSTROM       2,364,182

GAUGING INSTRUMENT

Filed Sept. 24, 1942       2 Sheets-Sheet 1

INVENTOR
EDWARD F. AHLSTROM.
BY
ATTORNEYS

Dec. 5, 1944. E. F. AHLSTROM 2,364,182
GAUGING INSTRUMENT
Filed Sept. 24, 1942 2 Sheets-Sheet 2
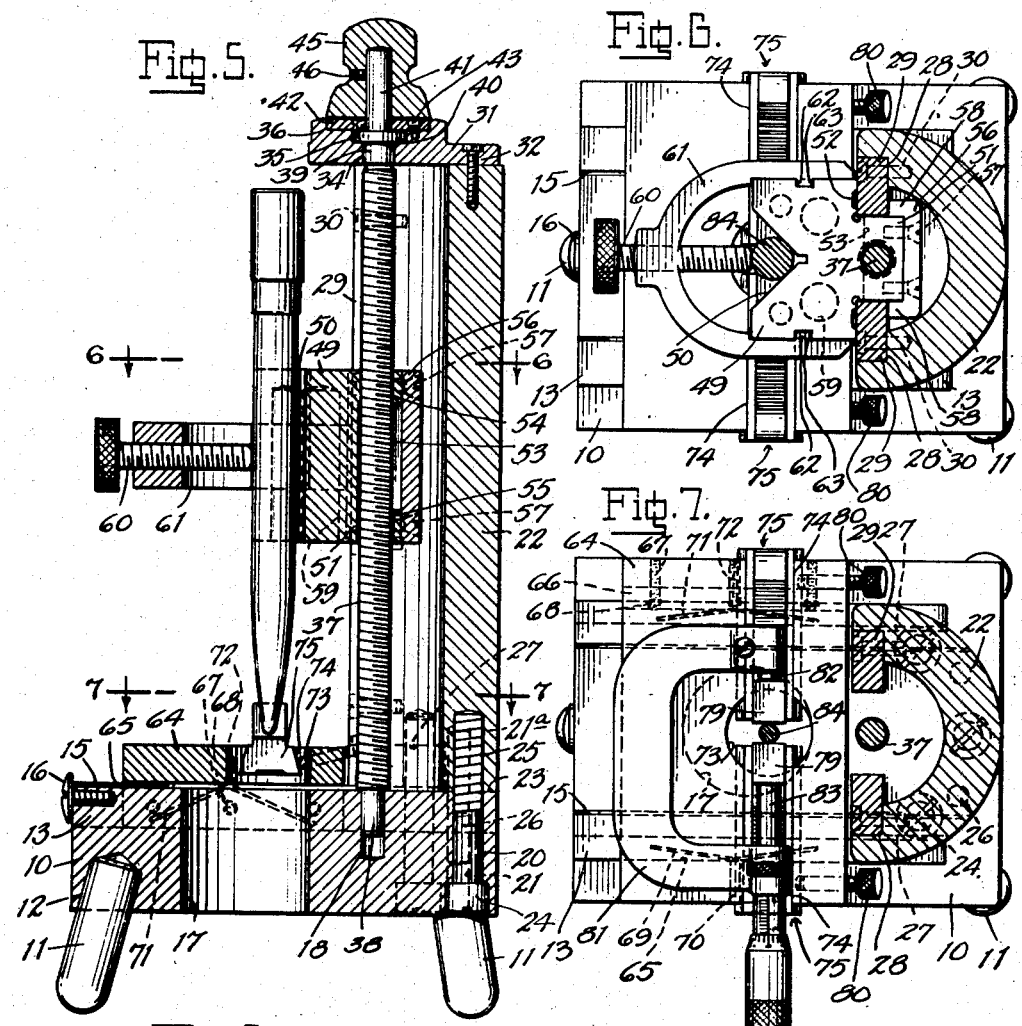
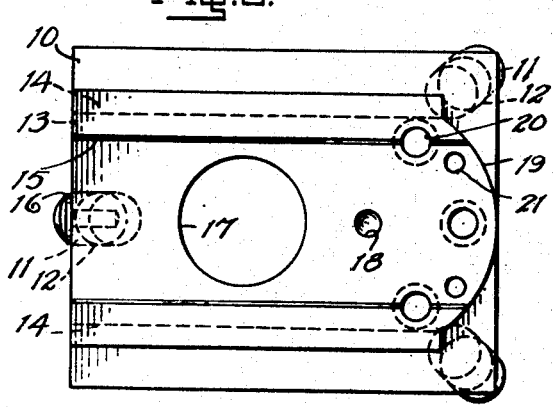
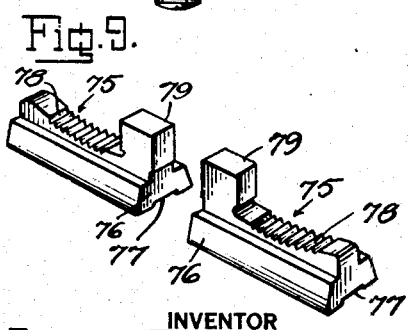
INVENTOR
EDWARD F. AHLSTROM.
BY
ATTORNEYS Patented Dec. 5, 1944

2,364,182

UNITED STATES PATENT OFFICE 2,364,182

GAUGING INSTRUMENT

Edward F. Ahlstrom, Kansas City, Mo., assignor to Remington Arms Company, Inc., Bridgeport, Conn., a corporation of Delaware Application September 24, 1942, Serial No. 459,493

11 Claims. (Cl. 33—174)

The present invention relates to a gauge device, particularly a vertical profile gauge for making a succession of vertically spaced diameter measurements of a work-piece, wherein it is of extreme importance that the vertical spacing of the measuring points may be very accurately predetermined and controlled, and wherein the diameter measurements must be made with the utmost precision. The gauge is especially adapted for the measuring of such work-pieces as a tapered or pointed tool, as for instance a bullet pointing punch which must be ground to a very accurate profile and wherein the diameter measurements must be made at vertically spaced points as small as .0005 inch apart.

It is an object of the invention to provide a gauge of very sturdy construction so that it is adapted for convenient use by workmen in the factory, and wherein the precise fit and operation of the movable parts will be maintained under such conditions.

Another object is to provide a gauge including work-piece calipering blocks adapted to be engaged at opposed sides of the work-piece, and which blocks are adapted to be engaged by a micrometer to conveniently determine the diameter of the section of the work-piece engaged by the blocks.

Another object is to provide a device in which various sizes and lengths of work-pieces may be measured, and wherein adjustment means is provided for accommodating such various sizes so that the calipering blocks may be centrally engaged with the work at diametrically opposite points irrespective of whether the body of the work-piece is of relatively small or relatively large diameter.

With the above and other objects in view an embodiment of the invention is shown in the accompanying drawings, and this embodiment will be hereinafter more fully described with reference thereto, and the invention will be finally pointed out in the claims.

In the drawings:

Fig. 5 is a vertical sectional view of the device, taken along the line 5—5 of Fig. 3, and showing a bullet pointing punch secured thereto.

Fig. 6 is a horizontal sectional view, taken along the line 6—6 of Fig. 5.

Fig. 7 is a horizontal section view, taken along the line 7—7 of Fig. 5, and showing the micrometer engaged with the calipering blocks.

Fig. 8 is a detail plan view of the base member of the device.

Fig. 9 is a perspective view of the two calipering blocks.

Similar reference characters indicate corresponding parts throughout the several parts of the drawings.

Figure 1:
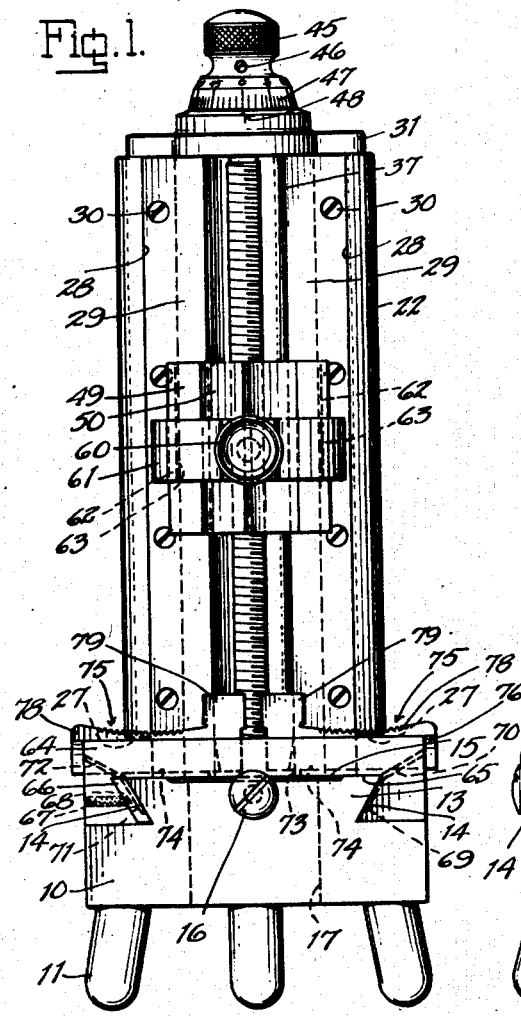
Fig. 1 is a front elevation of a gauge device, according to the illustrated exemplary embodiment of the invention.
Figure 2:
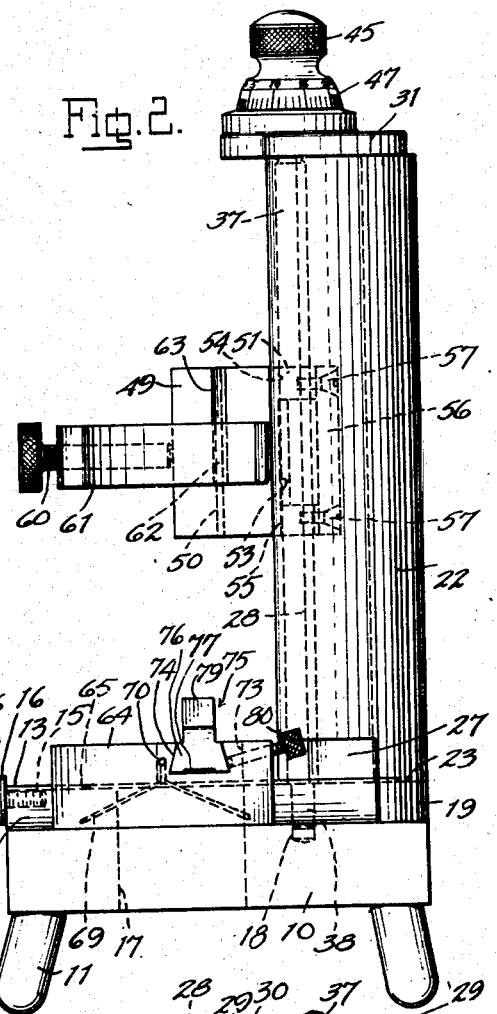
Fig. 2 is a side elevation.

Referring to the drawings, the gauge device, according to the illustrated exemplary embodiment of the invention shown therein, comprises a rectangular base member 10, supported in raised relation upon three outwardly inclined legs 11 engaged in sockets 12 provided in the underside of the base, one of these legs being provided centrally at the forward end and the other two at the rearward corners of the base. On the upper side of the base member there is formed a platform 13, having its longitudinal side walls 14—14 undercut and bevelled to provide a dove-tail slide-way for the slidably mounted calipering block-carrying member, hereinafter more fully referred to. The upper surface of the platform is provided with a recessed clearance channel 15 extending longitudinally with its side walls in parallel spaced relation to the side edges of the platform. At the forward end of the base, there is provided a stop screw 16 arranged centrally and having its head projected above the upper surface of the base to provide a removable forward stop to limit the forward sliding movement of the calipering block-carrying member.

A cylindrical vertically extending hole 17 is provided in the base member for the purpose of receiving the lower end of the work-piece as the latter is moved downwardly during the gauging operation, this hole being of sufficiently large diameter to clear any of the various sizes of work-pieces within the capacity of the gauge. Rearwardly of the hole 17 along the longitudinal center line of the base there is provided a cylindrical socket 18, constituting a bearing support for the lower end of the vertical adjustment micrometer screw of the device, hereinafter more fully referred to. The rearward wall of the platform is cylindrically shaped, as at 19, in concentric relation to the socket 18, and in forwardly spaced concentric relation to the wall 19 there are provided vertically extending bolt receiving holes 20, counterbored at their lower ends, and dowel receiving holes 21 for the purpose of rigidly attaching to the base the vertical standard 22 for supporting the micrometer screw.

Figure 4:
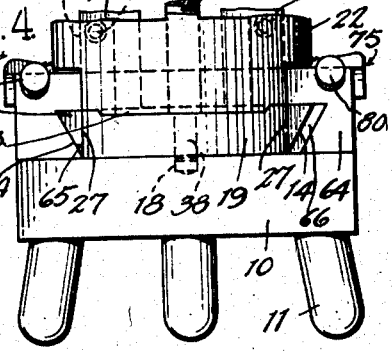
Fig. 4 is a rear elevation of the lower end portion of the gauge device, showing the base and lower end of the vertical standard supported thereon.

The standard 22 is of semi-cylindrical form concentric to the vertical axis of the socket 18, its lower end being seated upon the rearward end of the platform portion 13 of the base member, and being provided with a ribbed formation 23 to fit the clearance recess 15, as shown clearly in Fig. 4. The standard is securely fixed to the base by means of bolts 24 engaged in the bolt holes 20 and screwed into threaded holes 25 in the lower end of the standard, and is accurately positioned upon the base by means of dowels 26 engaged in the dowel holes 21 of the base and in dowel holes 21a in the lower end of the standard. At each side of the lower end of the standard there are provided cut-outs 27, the vertical walls of which are parallel to the longitudinal side edges of the slide-way platform so that clearance spaces are provided at the rear of the calipering block-carrying member at each side enabling it to be conveniently gripped by the fingers for the purpose of adjusting it forwardly and rearwardly. The forwardly disposed inner corners of the standard are provided with vertically extending right angle recesses 28—28, in which a pair of opposed spaced parallel guide bars 29 are secured by screws 30, these bars constituting a vertical guide-way for the vertically adjustable work-carrying member of the device, presently to be more fully described.

Figure 3:
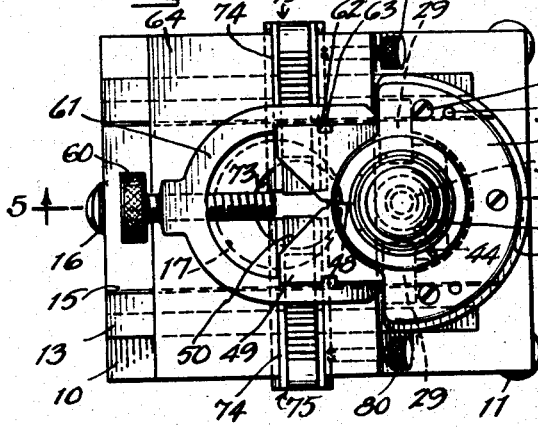
Fig. 3 is a top plan view.

Upon the upper end of the standard 22 there is provided a cap plate member 31, rigidly secured by screws 32, and accurately positioned by dowels 33, and provided in vertically aligned relation with the bearing socket 18 of the base with a bearing hole 34, provided at its upper end with an annular shouldered bearing recess 35 and an annular shouldered retaining-plate-receiving recess 36, for the purpose of providing bearing and retaining means for the micrometer screw. The micrometer screw 37 is of a diameter less than the diameter of the bearing hole 34, so that it may be assembled downwardly thereto, and at its lower end is provided with a reduced diameter bearing stem 38 engaged in the bearing socket 18 of the base member. At the upper end of the screw there is provided a cylindrical bearing portion 39 having bearing engagement in the hole 34, an annular flange portion 40 having bearing engagement in the annular recess 35, and a reduced diameter upwardly projecting stem portion 41 engaged through a centrally apertured retaining plate 42 secured in the annular recess 36 by means of screws 43. An oil hole 44 (Fig. 3), extends from the exposed rim portion of the cap plate surrounding the recess 36 to the recess 35, for the purpose of convenient lubrication of the upper bearing of the micrometer screw.

Upon the upper projecting stem portion 41 of the micrometer screw a turning knob 45 is engaged and rigidly secured by a set-screw 46. The lower peripheral surface of the knob, adjacent the rim portion of the cap plate surrounding the recess 36, is provided with calibrations 47, indicating fractional turning of the screw, these calibrations cooperating with an index mark 48 upon the rim. For instance, if the calibrations represent 50 divisions, as shown in the illustrated embodiment, each calibration indicates 1/50 of a single turn of the screw, thus indicating a vertical adjustment equal to 1/50 of the pitch of the micrometer screw. Thus, for instance, if this pitch is .025 inch, each division will represent an adjustment of .0005 inch.

The work holder comprises a V-block 49 provided in its forward face with a vertically disposed V-shaped recess 50 for receiving the work-piece, and provided at its rearward side with a bearing portion 51 slidably engaged between the vertical slideway bars 29, the rearwardly disposed vertical surfaces of the block at each side of this bearing portion having sliding engagement with the forward surfaces of the bars 29 and being preferably vertically grooved, as at 52. The portion 51 is cut out intermediate its ends, as at 53, the upper end portion being provided with a threaded passage 54 engaged by the micrometer screw 37, and the lower end portion being provided with a cylindrical passage 55 through which the micrometer screw has free engagement. A retaining plate 56 is secured by screws 57 to the rearward side of the bearing portions 51, and is provided with forwardly projecting side flange portions 58—58 having bearing engagement with the rearward surfaces of the bars 29. In order to lighten the weight of the V-block it may preferably have pockets 59 drilled therein from its lower surface to a point near its upper surface, thus providing a V-block of relatively large size and rigid structure, and which is at the same time of sufficiently light weight that fine adjustment may be delicately carried out by turning of the micrometer screw.

The work-piece is secured in the V-block by means of a clamping screw 60, carried in a U-shaped yoke member 61 supported upon the V-block, this yoke being provided upon the inner sides of its side arms with vertically disposed ribs 62 engaged in vertically disposed grooves 63 in the side surfaces of the V-block, extending downwardly from the upper side and terminating in spaced relation to the lower side, so that the yoke may be readily engaged and disengaged and in its engaged position is disposed centrally of the central lateral plane of the V-block. The work piece is secured by engaging it in the V-recess 50, where it engages along two contact lines, and firmly pressing it into the V-block by tightening the clamping screw 60, this tightening action drawing the ribs 62 forwardly against the forward walls of the grooves 63. It will be observed that the V-block and the clamping yoke and screw are such that cylindrical work-pieces of any size within the limits of the device may be secured.

Upon the dovetail slide-way platform portion 13 of the base member there is slidably mounted for forward and rearward movement a slide block 64 having a dovetail slot 65 in its underside, this block being of rectangular form and its width dimension being preferably the same as the width dimension of the base 10, while its longitudinal front to rear dimension is substantially less than the distance between the forward face of the standard 22 and the stop screw 16, so as to permit of forward and rearward sliding adjustment movement to accommodate the gauge to different diameters of work-pieces, as will presently more fully appear. One undercut side wall of the groove 65 engages directly with the undercut side wall 14 of the dovetail slide-way platform 13, while a gib strip 66 is interposed between the other undercut side wall and the other side wall 14 of the platform, this gib strip being retained against longitudinal displacement and being laterally adjustable by means of a series of pins 67 screwed in the slide block and projecting at their inner ends into pockets 68 provided in the outer surface of the gib strip. For the purpose of lubricating the slide block the undercut side wall of the groove 65 which directly engages the side wall of the platform 13 is provided with oil grooves 69 to which oil is supplied by an inclined duct 70 extending to the outer side wall of the slide block, and the inner bearing surface of the gib strip 66 is provided with oil grooves 71 to which oil is supplied by an inclined duct 72 extending to the other side wall of the slide block. Along the longitudinal center line of the slide block there is provided a vertically extending cylindrical hole 73, normally in axial line with the axis of the work in the gauge, and which in any position of adjustment of the slide block is in register with the larger diameter hole 17 of the base 10, so that the lower end of the work-piece may extend downwardly through the holes 73 and 17 and below the raised bottom surface of the base 10 in the space provided by the base supporting legs 11.

Transversely at each side of the hole 73, and in diametric alignment therewith, the slide block is provided with dovetail slide-way grooves 74 in which a pair of opposed work salipering jaw members 75—75 are respectively engaged for transverse sliding movement toward and away from each other, these jaw members each including a dovetail slide base 76 for engagement with the dovetail groove 74 having a clearance groove 77 in its underside, a concavely curved finger engaging rib 78 at its upper side having a knurled surface for convenient manipulation of the jaw by the finger, and a work-piece engaging calipering portion 79 at its inner end in the form of a rectangular block projecting upwardly and slightly inwardly. The upper horizontal flat surface of the block portion 79 forms with the inner flat vertical surface a sharp edge which constitutes the work-piece engaging portion of the calipering jaw, and the outer flat vertical surface parallel to and outwardly spaced from the inner vertical flat surface constitutes a micrometer engaging surface for determining the diameter measurement of the work. The adjusted positions of the calipering jaws may be fixed by means of set screws 80—80, respectively provided near each end of the rearward side of the slide member.

As shown clearly in Fig. 7, a micrometer caliper 81, of the usual yoke form, has its fixed anvil 82 engaged with the outer vertical face of the calipering jaw at one side of the work-piece, while its movable spindle element 83 is engaged with the outer vertical surface of the calipering jaw at the other side. The dimension between the inner and outer vertical surfaces of the block portion 79 is precisely predetermined, as for instance .500 inch, so that the combined dimensions of the two jaws represents one inch, and in determining the diameter of the work-piece from the micrometer reading the jaw dimension, or one inch, is subtracted from the micrometer reading.

In the operation of the device, the work-piece 84, which is illustrated as a tapered bullet-forming punch, is secured in the V-block 49 through tightening the clamping screw 60, the initial vertical position of adjustment being conveniently determined by resting the lower pointed end of the punch upon the upper flat surface of the block portion of one of the calipering jaw members which may be slid inwardly to a centralized position for this purpose. This may represent a zero setting of the device, from which zero point the several axially spaced diameter measurements of the tapered end may be made at predetermined points by lowering the work-piece a predetermined amount for each measurement through turning the micrometer screw by means of the knob 45. Each single turn of the knob represents a predetermined vertical axial adjustment movement, and fractions of this movement may be determined by the calibrations of the knob.

The calipering jaw members are positioned by moving the slide member upon the base so that the calipering jaws are in substantially central alignment with the work-piece, it being pointed out that with a relatively small diameter work-piece, such as shown, the slide member is moved rearwardly while a larger diameter work-piece will have the slide moved forwardly. In any position of adjustment, the hole 74 of the slide member is within the outline of the larger diameter hole 17 of the base, and is of sufficient size to allow the work-piece to be moved downwardly therethrough as the gauging operation progresses. To determine the diameter reading the calipering jaws are manually moved into firm engagement with the work-piece and their positions are fixed by tightening the set screws 80. The micrometer caliper is thereupon engaged with the outer vertical surface of the calipering jaws and the diameter reading is determined by subtracting the predetermined dimension of these jaws, as for instance one inch, from the micrometer reading.

The form of the invention illustrated in the drawings and described herein is typical and illustrative only, and it is evident that the invention is capable of embodiments in other forms, all falling within the scope of the appended claims, which are to be broadly construed.

What is claimed is:

1. In a gauge device, a support having an opening therethrough and slideways diametrically opposed at each side of said opening, a pair of work-piece engaging calipering members both movably mounted in said slideways including means arranged to engage opposed sides of the work-piece and means adapted to be engaged by a calipering measuring device to determine the dimension of the engaged work-piece, one of said calipering members being located at each side of said opening.

2. In a gauge device, a support, a work-piece holder movably mounted on said support for rectilinear movement, a micrometer screw carried by said support engaging said work-piece holder to impart rectilinear movement thereto, a calibrated turning knob for said screw, a pair of work-piece engaging calipering members movably mounted on said support for movement in a plane at right angles to the direction of movement of said work holder including means arranged to engage opposed sides of the work-piece carried by said work holder and means adapted to be engaged by a calipering measuring device to determine the dimension of the engaged work-piece.

3. In a gauge device, a support, a work-piece holder movably mounted on said support for rectilinear movement, a slide member movably mounted on said support for rectilinear movement in a plane at right angles to the direction of movement of said work-piece holder, a pair of work-piece engaging calipering members movably mounted on said slide member for movement at right angles to the direction of movement of said slide member and in a plane at right angles to the direction of movement of said work-piece holder including means arranged to engage opposed sides of the work-piece carried by said work-piece holder and means adapted to be engaged by a calipering measuring device to determine the dimension of the engaged work-piece.

4. In a gauge device, a support, a work-piece holder movably mounted on said support for rectilinear movement including a fixed work-piece receiving part adapted to receive different diameter work-pieces and adjustable clamping means for securing the work-piece, a slide member movably mounted on said support for rectilinear movement in a plane at right angles to the direction of movement of said work holder to adjust said slide member with respect to different diameter work-pieces, a pair of work-piece engaging calipering members movably mounted on said slide member for movement at right angles to the direction of movement of said slide member and in a plane at right angles to the direction of movement of said work-piece holder including means arranged to engage opposed sides of the work-piece carried by said work-piece holder and means adapted to be engaged by a calipering measuring device to determine the dimension of the engaged work-piece.

5. In a gauge device, a support including a base part and a standard part perpendicular to said base part and each including guide-way means, a work-piece holder movably mounted on said guide-way means of said standard part for rectilinear movement including a fixed work-piece receiving part adapted to receive different diameter work-pieces and adjustable clamping means for securing the work-piece, a slide member movably mounted on said guide-way means of said base part for rectilinear movement in a plane at right angles to the direction of movement of said work-piece holder to adjust said slide member with respect to different diameter work-pieces, a pair of work-piece engaging calipering members movably mounted on said slide member for movement at right angles to the direction of movement of said slide member and in a plane at right angles to the direction of movement of said work-piece holder including means arranged to engage opposed sides of the work-piece carried by said work-piece holder and means adapted to be engaged by a calipering measuring device to determine the dimension of the engaged work-piece.

6. In a gauge device, a support including a base part and a standard part perpendicular to said base part and each including guide-way means, a work-piece holder movably mounted on said guide-way means of said standard part for rectilinear movement including a V-recess part adapted to receive different diameter work-pieces and an adjustable clamping screw opposed to said V-recess part for securing the work-piece, a slide member movably mounted on said guide-way means of said base part for rectilinear movement in a plane at right angles to the direction of movement of said work-piece holder to adjust said slide member with respect to different diameter work-pieces, a pair of work-piece engaging calipering members movably mounted on said slide member for movement at right angles to the direction of movement of said work-piece holder including means arranged to engage opposed sides of the work-piece carried by said work-piece holder and means adapted to be engaged by a calipering measuring device to determine the dimension of the engaged work-piece.

7. In a gauge device, a support including a base part and a standard part perpendicular to said base part and each including guide-way means, a work-piece holder movably mounted on said guide-way means of said standard part for rectilinear movement including a fixed work-piece receiving part adapted to receive different diameter work-pieces and adjustable clamping means for securing the work-piece, a slide member having a work-piece receiving opening and movably mounted on said guide-way means of said base part for rectilinear movement in a plane at right angles to the direction of movement of said work-piece holder to adjust said opening of said slide member to align it with respect to different diameter work-pieces, a pair of work-piece engaging calipering members movably mounted on said slide member at diametrically opposed sides of said opening for movement at right angles to the direction of movement of said slide member and in a plane at right angles to the direction of movement of said work-piece holder including means arranged to engage opposed sides of the work-piece carried by said work-piece holder and means adapted to be engaged by a calipering measuring device to determine the dimension of the engaged work-piece.

8. In a gauge device, a support including a base part having a work-piece receiving opening and a standard part perpendicular to said base part and each including guide-way means, a work-piece holder movably mounted on said guide-way means of said standard part for rectilinear movement including a fixed work-piece receiving part adapted to receive different diameter work-pieces and adjustable clamping means for securing the work-piece, a slide member having a work-piece receiving opening in register with said opening of said base part and movably mounted on said guide-way means of said base part for rectilinear movement in a plane at right angles to the direction of movement of said work-piece holder to adjust said opening of said slide member to align it with respect to different diameter work-pieces, a pair of work-piece engaging calipering members movably mounted on said slide member at diametrically opposed sides of said slide member opening for movement at right angles to the direction of movement of said slide member and in a plane at right angles to the direction of movement of said work-piece holder including means arranged to engage opposed sides of the work-piece carried by said work-piece holder and means adapted to be engaged by a calipering measuring device to determine the dimension of the engaged work-piece.

9. In a gauge device, a support including a base part and a standard part perpendicular to said base part and each including guide-way means, a work-piece holder movably mounted on said guide-way means of said standard part for rectilinear movement including a fixed work-piece receiving part adapted to receive different diameter work-pieces and adjustable clamping means for securing the work-piece, a micrometer screw carried by said standard part engaging said holder to impart rectilinear movement thereto, a slide member movably mounted on said guide-way means of said base part for rectilinear movement in a plane at right angles to the direction of movement of said work-piece holder to adjust said slide member with respect to different diameter work-pieces, a pair of work-piece engaging calipering members movably mounted on said slide member for movement at right angles to the direction of movement of said slide member and in a plane at right angles to the direction of movement of said work-piece holder including means arranged to engage opposed sides of the work-piece carried by said work-piece holder and means adapted to be engaged by a calipering measuring device to determine the dimension of the engaged work-piece.

10. In a gauge device, a support, a movable work-piece holder carried by said support, indexing means carried by said support to predeterminedly move said holder relative to said support, adjustable means carried by said holder to clamp a piece of work thereto in predetermined relationship to said indexing means, and a pair of work-piece engaging calipering members movably mounted on said support for movement transverse to the direction of movement of said work holder, said calipering members including means arranged to engage opposed sides of the work-piece and means adapted to be engaged by a calipering measuring device to determine the dimension of the engaged work-piece.

11. In a gauge device, a support, a movable work-piece holder carried by said support, a pair of work-piece engaging calipering members movably mounted on said support for freely sliding movement transverse to the direction of movement of said work holder including means arranged to engage opposed sides of the workpiece and means adapted to be engaged by a calipering measuring device to determine the dimension of the engaged work-piece, and means carried by said holder to secure a piece of work thereon in predetermined relation to said calipering members.

EDWARD F. AHLSTROM.